(12) United States Patent
Huda et al.

(10) Patent No.: US 12,088,510 B2
(45) Date of Patent: Sep. 10, 2024

(54) SYSTEM AND METHOD OF SOFTWARE DEFINED NETWORK ENABLED SLICING AS A SERVICE UTILIZING ARTIFICIAL INTELLIGENCE

(71) Applicant: AT&T Intellectual Property I, L.P., Atlanta, GA (US)

(72) Inventors: Eshrat Huda, Hillsborough, NJ (US); Moshiur Rahman, Marlboro, NJ (US); David H. Lu, Morganville, NJ (US); Russell Fischer, Bernardsville, NJ (US); Prafulla Verma, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/944,822

(22) Filed: Sep. 14, 2022

(65) Prior Publication Data
US 2024/0089218 A1    Mar. 14, 2024

(51) Int. Cl.
| | | |
|---|---|---|
| *H04L 47/70* | (2022.01) | |
| *H04L 41/122* | (2022.01) | |
| *H04L 41/147* | (2022.01) | |
| *H04L 41/16* | (2022.01) | |
| *H04L 47/83* | (2022.01) | |

(52) U.S. Cl.
CPC .......... *H04L 47/83* (2022.05); *H04L 41/122* (2022.05); *H04L 41/147* (2013.01); *H04L 41/16* (2013.01); *H04L 47/829* (2013.01)

(58) Field of Classification Search
CPC ............. H04L 47/829; H04L 47/823; H04L 41/147; H04L 41/16; H04W 28/24
See application file for complete search history.

(56) References Cited

U.S. PATENT DOCUMENTS

| | | | | |
|---|---|---|---|---|
| 10,542,078 | B1* | 1/2020 | Farrugia | G06F 16/90 |
| 2010/0246404 | A1* | 9/2010 | Bradford | H04L 45/125 |
| | | | | 370/237 |
| 2012/0131198 | A1* | 5/2012 | Melander | G06F 9/5033 |
| | | | | 709/226 |
| 2013/0080623 | A1* | 3/2013 | Thireault | H04L 41/40 |
| | | | | 709/224 |
| 2015/0331635 | A1* | 11/2015 | Ben-Shaul | G06F 3/067 |
| | | | | 711/120 |
| 2017/0366606 | A1* | 12/2017 | Ben-Shaul | G06F 3/061 |
| 2018/0227768 | A1* | 8/2018 | Samdanis | H04W 28/24 |
| 2019/0159029 | A1* | 5/2019 | Li | H04W 12/06 |
| 2019/0173779 | A1* | 6/2019 | Gruner | H04L 61/4511 |
| 2019/0174498 | A1* | 6/2019 | Samdanis | H04W 16/10 |
| 2020/0133702 | A1* | 4/2020 | Sharma | G06F 9/5088 |
| 2021/0011765 | A1* | 1/2021 | Doshi | G06F 9/5077 |

(Continued)

*Primary Examiner* — Muhammad Raza
(74) *Attorney, Agent, or Firm* — Guntin & Gust, PLC; Dana B. LeMoine

(57) ABSTRACT

Aspects of the subject disclosure may include, for example, receiving workload requests for tenant devices providing services to user devices; partitioning node resources to facilitate network slicing in a software defined network to provide the services; determining that the workload requests exceed available resources of the node; and outsourcing a portion of a load to one or more neighboring nodes, where the outsourcing is performed in coordination with a regional orchestrator and a SDN intelligence module. Other embodiments are disclosed.

20 Claims, 7 Drawing Sheets

(56) References Cited

U.S. PATENT DOCUMENTS

| | | | |
|---|---|---|---|
| 2022/0263826 A1* | 8/2022 | Ping | H04W 12/35 |
| 2023/0041375 A1* | 2/2023 | Yao | H04W 28/24 |
| 2023/0362460 A1* | 11/2023 | Jayachandran | G11B 27/036 |
| 2023/0422086 A1* | 12/2023 | Sridhar | H04W 24/04 |

* cited by examiner

SYSTEM AND METHOD OF SOFTWARE DEFINED NETWORK ENABLED SLICING AS A SERVICE UTILIZING ARTIFICIAL INTELLIGENCE

FIELD OF THE DISCLOSURE

The subject disclosure relates to a system and method of software defined network enabled slicing as a service that can utilize artificial intelligence.

BACKGROUND

Cloud computing can include compute, storage and networking equipment, which can be made available, such as in a centralized location (e.g., a data center). The cloud infrastructure can be located in multiple locations to meet the scalability, reliability and performance needs of applications. Cloud infrastructure can be managed by public cloud service providers and/or owned by private entities. Applications being hosted in centralized Cloud data centers may not always be an ideal situation, particularly for applications with low latency requirements.

Software Defined Network (SDN) architecture can provide some control plane functionalities which enable network slicing. This network slicing can be performed in a centralized nature. Intermediate control planes can be used to deliver services to users in an application plane by configuring and abstracting physical resources. Such a centralized architecture that would support network slicing by collecting the information needed to communicate with each user and creating an abstract set of resources (as resource groups) to support control logic that constitutes a slice, including related services attributes of users, would not properly support dynamic resource calculation by nodes (e.g., Multi-access or Mobile Edge Computing (MEC) or Fog nodes) upon receiving tenant/user slice requests. 3GPP network sharing management architecture can allow acquiring slices from service providers to run network functions, but does not leverage SDN. A 5G network slicing broker allows service providers to directly create network slices according to requirements, however, the network slicing broker supports slicing of networking resources that are centrally controlled by a master operator-network manager (MO-NM).

BRIEF DESCRIPTION OF THE DRAWINGS

Reference will now be made to the accompanying drawings, which are not necessarily drawn to scale, and wherein.

DETAILED DESCRIPTION

Figure 1:
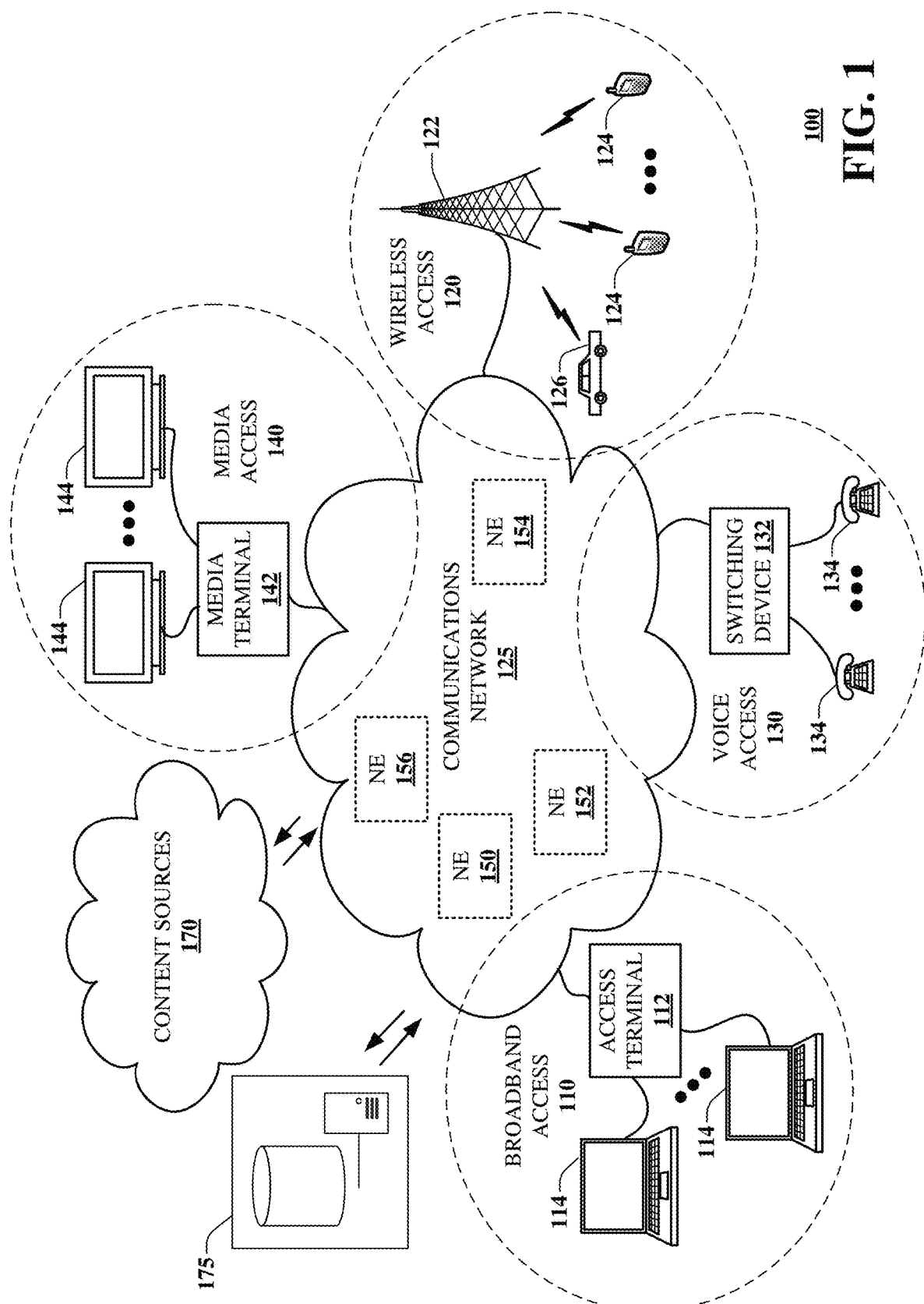
FIG. 1 is a block diagram illustrating an exemplary, non-limiting embodiment of a communications network in accordance with various aspects described herein.

The subject disclosure describes, among other things, illustrative embodiments for orchestrating and monitoring of logical slices of or from an access network. The orchestration and monitoring can be performed utilizing an artificial intelligence/machine learning (AI/ML) enabled software defined network and can extend over a wide range of the delivery of the slice(s) such as all the way from the network to the node computing, such as Fog nodes and/or cloud nodes. In one or more embodiments, slicing as a service is provided by using AI-enabled SDN-controlled distributed Fog or MEC networks at the edge, although the slicing (or a portion thereof) can be provided via other nodes or other network elements. In one or more embodiments, an end to end service path is provided via intelligent slicing management from the network to the edge. In one or more embodiments, a dynamic network slicing architecture can support a large-scale Fog computing and/or MEC network (e.g., for a distinct entity) where a regional orchestrator(s) can interact with an SDN intelligence module(s) and analytics module(s) to efficiently and effectively provide network slices to multiple tenants that are providing services to users. For example, each node can coordinate with a subset of its neighboring nodes (or other nodes) via a regional orchestrator which interacts with the SDN intelligence module to create network slices for tenants delivering user services, such as a common set of services requested by local user devices (e.g., an Over-the-Top (OTT) video service client). In one or more embodiments, each tenant sends a resource request together with location information of each user device. The workload request of each user can be first assigned to the closest node (e.g., a Fog node or MEC node), although other techniques can be utilized for initial assignment which may or may not consider location information of the user device. Each node can then partition its own resources according to the total received requests, in consultation (e.g., providing notice, following SDN guidance, and so forth) with the SDN intelligence module. If a node receives requests that exceed its available resources, then the node can coordinate with the regional orchestrator which in turn will coordinate with the SDN intelligence module to outsource a part or portion of its load to one or more neighboring nodes (e.g., Fog nodes and/or MEC nodes). If a node (e.g., Fog node or a MEC node) has surplus resources, then the node can report this surplus to the SDN intelligence module, such as via a regional orchestrator, so that the SDN intelligence module and/or regional coordinator can then coordinate with other nodes (e.g., Fog nodes and/or MEC nodes) to forward (or otherwise outsource) the appropriate amounts of their workload to the other node(s) with the surplus resource(s). In one or more embodiments, an analytics node(s) can receive or otherwise obtain available health statistics from the entire network, including all Virtual Machines (VMs) (e.g., operating on Fog or MEC nodes), compute, and orchestrators, which can assist the SDN intelligence module in performance of real-time resource availability determination and management. The health statistics can be various data that describes and/or measures network operations and performance, and can be collected from various devices including network elements or other communication devices connected with the network. For example, analytics can be performed which constantly or frequently mine real-time Fault Management (FM) and Performance Management (PM) data and which will then provide knowledge as to whether any unused future target resource is functional or not, and thus prevent any undesired target slice allocation and migration. Other embodiments are described in the subject disclosure.

One or more aspects of the subject disclosure include a device, comprising: a processing system including a processor; and a memory that stores executable instructions that, when executed by the processing system, facilitate performance of operations. The operations can include receiving, over a network from tenant devices, resource requests that include location information of user devices. The operations can include assigning workload requests for each of the user devices to nodes that are determined to be closest to each of the user devices, where each of the nodes partition node resources according to total received requests, where the assigning the workload requests to the nodes is part of network slicing managed by the processing system in a software defined network. The operations can include outsourcing a portion of a load of a first node of the nodes to a second node of the nodes according to a determination that the workload requests corresponding to the first node exceed a threshold associated with available resources of the first node.

One or more aspects of the subject disclosure include a method, comprising obtaining, by a processing system including a processor, performance statistics associated with a network from an analytics node. The method includes determining, by the processing system utilizing a machine learning model, a prediction of at least one of future resource availability for one or more nodes, future change to workload requirements for one or more workload requests of user devices, future workload requests for one or more of the user devices, or any combination thereof, where the machine learning model is applied to the performance statistics. The method includes assigning, by the processing system based in part on the prediction, workload requests for each of the user devices to the nodes, where the assigning the workload requests to the nodes is part of network slicing managed by the processing system in a software defined network.

One or more aspects of the subject disclosure include a non-transitory machine-readable medium, comprising executable instructions that, when executed by a processing system including a processor of a node, facilitate performance of operations. The operations include receiving workload requests for tenant devices providing services to user devices. The operations include partitioning node resources to facilitate network slicing in a software defined network to provide the services. The operations include determining that the workload requests exceed available resources of the node. The operations include outsourcing a portion of a load to one or more neighboring nodes, where the outsourcing is performed in coordination with a regional orchestrator and a SDN intelligence module.

Referring now to FIG. 1, a block diagram is shown illustrating an example, non-limiting embodiment of a system 100 in accordance with various aspects described herein. For example, system 100 can facilitate in whole or in part receiving, over a network from tenant devices, resource requests that include location information of user devices; assigning workload requests for each of the user devices to nodes (e.g., nodes that are determined to be closest to each of the user devices) where each of the nodes partition node resources according to total received requests and where the assigning the workload requests to the nodes is part of network slicing managed by the processing system in a software defined network; outsourcing a portion of a load of one or more of the nodes to other nodes according to a determination that the workload requests corresponding to the one or more overloaded nodes exceed a threshold associated with available resources of the one or more overloaded nodes; and/or determining (e.g., utilizing a machine learning model) a prediction of at least one of future resource availability for one or more of the nodes, future change to workload requirements for one or more of the workload requests of the user devices, future workload requests for one or more of the user devices, or any combination thereof, where assigning of the workload requests, the outsourcing of the portion of the load, or both can be based in part on the prediction.

One or more of the functions described herein, which facilitate orchestrating and monitoring of logical slices, can be performed by a server 175 (e.g., a single or multiple computing devices) which can include various components including a SDN intelligence module, a database, and so forth. The server 175 can communicate with various other devices in the network including orchestrators (shown in FIG. 2A) and/or analytics node(s) (shown in FIG. 2A) which facilitate implementation of the network slicing and collecting of network data (e.g., FM and PM data or other network-related statistics) that can be utilized for real-time, dynamic allocation of network slices to tenants, including via machine learning modeling. In one or more embodiments, the AI/ML processing can be performed at the server 175 and/or performed at other devices with the results (e.g., predictions associated with availability of resources) being accessible to the server 175, such as accessible to the SDN intelligence module being executed by the server 175.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 170 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 170. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 170 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
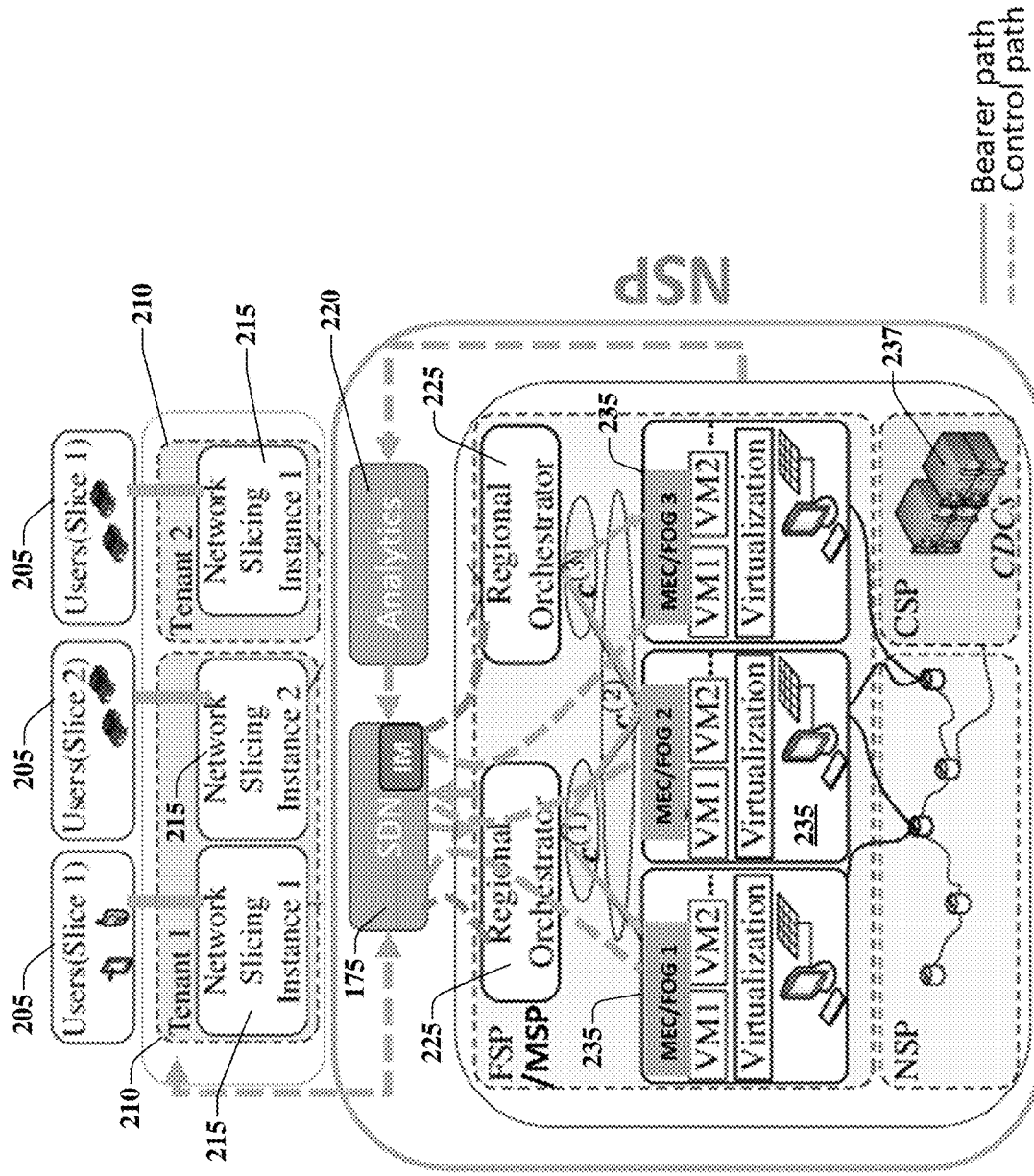
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. System 200 can be operated by a single service provider or multiple service providers, which can be various types or combinations of types of service providers including network service providers (NSPs), cloud service providers (CSPs), Fog service providers (FSPs), or other entities that can facilitate orchestration and management of network slicing to tenants, which can be various types of entities including content service providers (e.g., OTT video service providers, gaming content platforms, and so forth), virtual network operators (VNOs), application service platforms, social network platforms, location services platform, and so forth. System 200 can include various nodes (e.g., computing devices configured to execute virtualization such as virtual machines, network slicing, and so forth) which can be positioned in various locations throughout the network. As an example, the nodes can be servers or other computing devices that are capable of operating or executing virtual machines that are utilized in SDN network slicing. Various types of nodes and combinations of nodes can be utilized in system 200. In one or more embodiments, the nodes can be edge devices that are positioned, such as at or near a boundary between networks, to provide an entry point into backbone and/or core networks, including enterprise or service provider core networks. These edge devices can also provide connections into carrier and service provider networks.

In one or more embodiments, the nodes can include Fog nodes (alone or on combination with other types of nodes). For example, the Fog architecture can utilize edge devices to perform significant amounts of compute, storage, and networking functions locally which is then routed to the desired recipient such as over the Internet. Fog nodes can communicate with each other and exchange information in a peer-to-peer fashion. In one or more embodiments, the Fog architecture can operate according to Fog standards. In one embodiment, the Fog infrastructure can be utilized alone or in conjunction with other nodes or devices, such as cloud data centers. In one or more embodiments, the Fog nodes can be utilized to create a hierarchical mesh between the Cloud and user devices which can improve performance (e.g., latency) and/or scalability for user devices, including mobile phones, IOT devices, and so forth. In one embodiment, the Fog network can selectively process data either locally at the edge infrastructure or in a centralized cloud infrastructure, such as based on various factors including application's performance, latency requirements, network conditions, and so forth.

In one or more embodiments, the nodes of system 200 can include MEC nodes (alone or in combination with other nodes including Fog nodes which can bring the cloud infrastructure closer to the users to improve performance and latency). As an example, the MEC nodes can operate according to standardization by ETSI group. In one or more embodiments, the Fog architecture can be hierarchical, while the MEC architecture is flat (e.g., there can be multiple layers of Fog nodes between the Cloud and user devices while there can be a single layer of MEC nodes deployed in the edge). In one or more embodiments, Fog nodes can communicate with each other and/or can communicate with other MEC nodes in the network. Other configurations of nodes can also be utilized which are hierarchical, flat, or a combination thereof.

In one or more embodiments, the system 200 can utilize network slicing to facilitate OTT video services, IOT communication/management, Augmented Reality (AR) services, Virtual Reality (VR) services, Extended Reality (XR) services, smart car services, unmanned vehicle services, and so forth, and to provide operations and management to other service(s) where particular service(s) have particular requirements (e.g., low latencies). In one or more embodiments, the service provider(s) can utilize their data centers alone or in combination with Fog and/or MEC nodes to fulfill these requirements (e.g., QoS requirements that include sub-millisecond latencies).

System 200 utilizes SDN server 175 to provide Slicing as a Service. The real-time dynamic control of the network slicing can be performed utilizing AI-enabled SDN-controlled distributed Fog and/or MEC networks at the edge, which are illustrated as nodes 235. For example, the NSP can deploy a large distributed sliced wireless network infrastructure (e.g., part of the RAN) that connects user devices 205 to Fog nodes/MEC nodes 235 and/or remote cloud data centers (CDCs) 237. Tenant devices 210 (e.g., OTT content providers, VNOs and so forth) can lease or otherwise utilize resources from the NSP/infrastructure provider(s) in order to provide services to the end-user devices 205. Various connections between components of system 200 are illustrated in FIG. 2A, including bearer path and control path connections, however, other configurations can also be utilized by system 200. One or more of the exemplary embodiments herein describe leasing of Slicing as a Service, however, other arrangements or agreements can dictate or otherwise be utilized between entities involved in providing and receiving Slicing as a Service, including the Slicing as a Service being provided by and received by a single entity.

In one or more embodiments, the server 175 is part of an ML-enabled SDN that includes an intelligence module (e.g., in the SDN node 175) to specifically manage the real-time dynamic allocation and management of network slicing, including processing and/or providing pre-built rules and logic needed, or otherwise utilized, for any prospective tenants 210 to secure the desired slices 215 for their direct customers and to provision them on demand. In one or more embodiments, system 200 can provide QoS-guaranteed SDN-enabled computational services for distributed Fog and/or MEC nodes 235 to end user devices 205 while optimizing or improving utilization of local resources of the Fog and/or MEC nodes. In one or more embodiments, the system 200 can provide a unified and coordinated logic for implementing real-time dynamic network slicing allocation and management, which improves upon (while also incorporating) one or more techniques and components that are utilized in current SDN and 5G slicing orchestration mechanisms.

In one embodiment, the tenants 210 can include VNOs that lack network RAN and core E2E infrastructure and/or have limited capacity and/or coverage for the service(s) they intend to provide to the user device(s) 205, where the tenants are permitted to lease resources from other services/infrastructure providers (e.g., an NSP that operates the server 175 and that operates or otherwise can access the resources of nodes 235).

In one or more embodiments, each tenant device 210 can request networking and/or computational resources (e.g., network slices) from one or more providers to serve the needs of the users, where the requests can be at any time and/or can be during designated time periods. User devices 205 can be various types including mobile devices, IOT devices, vehicles, and so forth or can be applications that consume the services (e.g., video client, disaster recovery application) that are offered by the tenants. In this example, the user devices 205 can be located in a wide geographical area and can request different types of services with different QoS requirements from the tenants.

In one or more embodiments, NSP, FSP and/or CSP can be a same provider/entity or can be different providers/entities. In one or more embodiments, components or elements of system 200 and/or entities operating such components or elements may not always be physically separated or different from one another. For example, a cellular network operator operating as an NSP with insufficient computational resources can lease computational resources (e.g., server/CPU times) from an FSP to support computationally intensive service (e.g., AR/VR-based services, online gaming, etc.) requested by its subscribers. In this example, the particular NSP with insufficient resources can be considered as a tenant of the computational infrastructure of the FSP.

In another embodiment, CSPs and/or FSPs can also lease networking infrastructure of an NSP (e.g., a telecommunications provider with physical infrastructure including a core network) to reduce the service response-time of its users. In this example, the CSP and/or FSP can be considered the tenant of the networking infrastructure of the NSP (e.g., telecommunications provider). In one or more embodiments, the interaction between tenants and service providers (e.g., NSP/CSP/FSP) can be closely related to ownership, as well as availability of the shared resources.

In one or more embodiments, Slicing as a Service utilizing AI-enabled SDN-controlled functionalities involves cross-logic coordination of entities when making network slicing decisions, such as each tenant directly requesting the service slices from the FSP/MSP; or the tenants and FSP/MSP negotiating and jointly deciding the slicing/partitioning of the resource. System 200 provides architecture which supports these functionalities through use of SDN and AI.

In one or more embodiments, system 200 can provide network slicing as a service by using AI-enabled SDN-controlled distributed Fog and/or MEC networks at the edge where regional orchestrators 225 interact (e.g., over a network) with the SDN intelligence module of server 175 which also communicates with the analytics node 220 for obtaining data that is processed by or otherwise utilized with the ML model. In one example, each (or some) of Fog and/or MEC nodes 235 can coordinate with a subset of its neighboring Fog or MEC nodes via a regional orchestrator 225 which interacts with the SDN intelligence module of server 175 to create network slices for a common set of services requested by the local user devices 205. For instance, each tenant 210 can send the resource request(s) together with location information of each user device 205. The workload request of each user device 205 can be first assigned to the closest Fog or MEC node 235, although other assignment techniques and factors can be utilized and considered including network conditions, service agreements, and so forth. In this example, each Fog and/or MEC node 235 can then partition its own resources according to total received requests in consultation or coordination with the SDN intelligence module of server 175. Other partitioning techniques and/or partitioning factors (e.g., type of service, QoS requirements, and so forth) can also be implemented or considered, which may or may not be coordinated with the SDN intelligence module of server 175. Continuing with this example, if a Fog or MEC node 235 receives requests that exceed its available resources (e.g., is above a capacity threshold), it can coordinate with the regional orchestrator 225 which in turn will coordinate with SDN intelligence module of server 175 to outsource a portion of its load to one or more neighboring (or otherwise located) Fog and/or MEC nodes. In one or more embodiments, if a Fog and/or MEC node 235 has (or determines it has) surplus resources, it can report this surplus to the SDN intelligence module of server 175 (via regional orchestrator 225), so that the SDN intelligence module can then coordinate with other Fog and/or MEC nodes to forward the appropriate amounts of their workload to the available nodes with the surplus resource. In one or more embodiments, this coordination and forwarding of appropriate amounts of overloaded node workload to available nodes with surplus resources can be performed in conjunction with ML modeling that generates predictions such as to future resource availability/requirements. In one or more embodiments, the analytics node 220 can receive all or some of the available network status information (e.g., health statistics) from the entire network (or a portion thereof), such as from all or some of the VMs (e.g., Fog and/or MEC nodes), compute resources, and orchestrators, which can assist the SDN intelligence module in performing real-time resource availability detection and management. As an example, the analytics node 220 can continuously or periodically mine or otherwise collect real-time and/or historical Fault Management and/or Performance Management data so that the SDN intelligence module can determine or predict if any unused future target resource is functional or not, and thus avoid any faulty target slice resource allocation and migration.

System 200 allows for any number of end user devices 205 to utilize one or more services that are provided by tenant(s) 210 in whole or in part utilizing one or more network slicing instances 215 that are allocated and managed by the SDN intelligence module of server 175. The network slices can be providing via virtualization utilizing any number of virtual machines that are executed on one or more devices, such as one or more Fog and/or MEC nodes. The coordination and management of the network slicing can be facilitated utilizing the regional orchestrators 225 that can communicate with some or all of the devices executing the virtual machines, as well as with the SDN intelligence module of server 175. Various other components can be utilized to facilitate orchestration and management of network slicing, including routers, computing resources of CSPs such as in cloud data centers, and so forth.

Figure 2B:
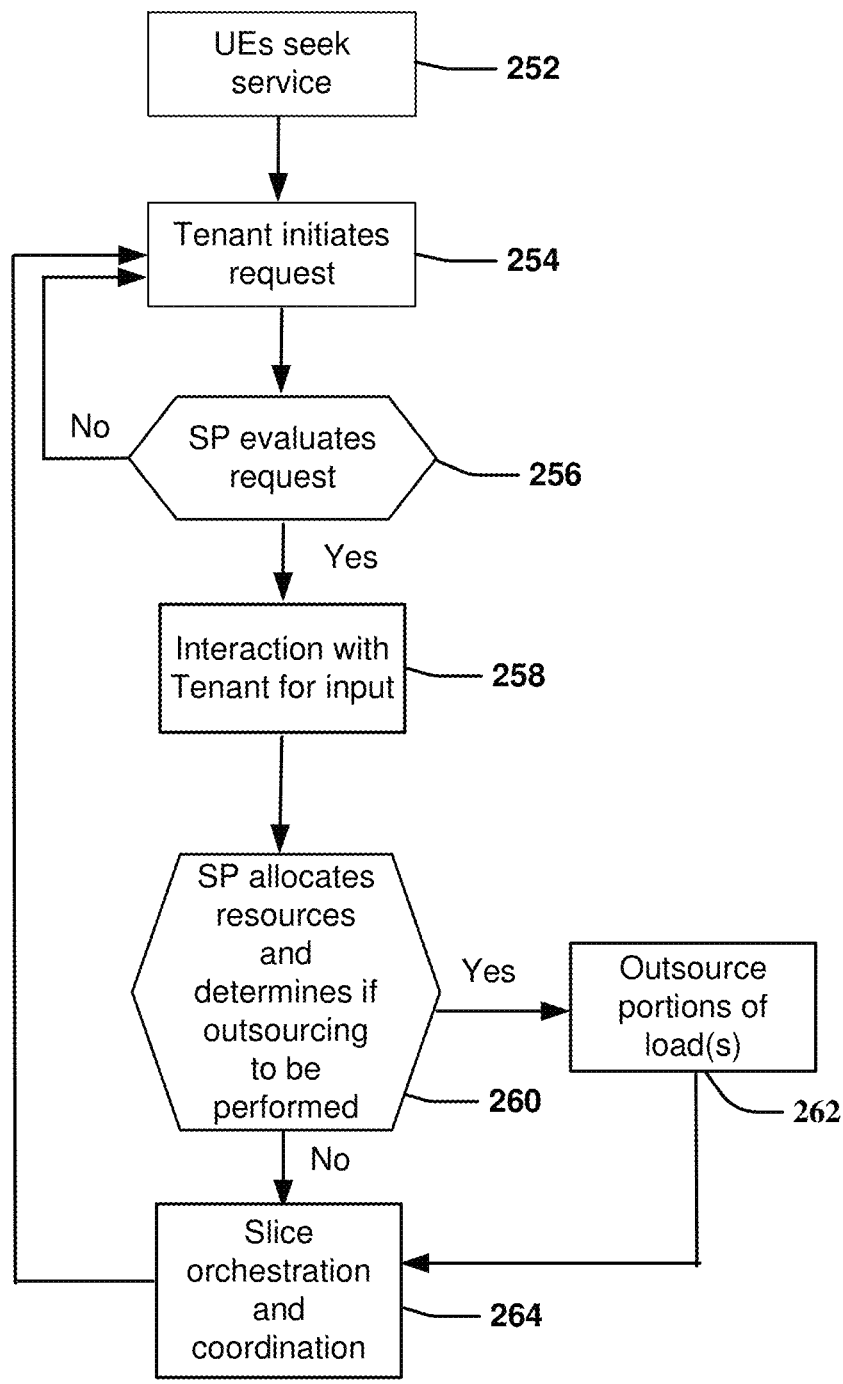
FIG. 2B depicts an illustrative embodiment of a method in accordance with various aspects described herein.

FIG. 2B depicts an illustrative embodiment of a method 250 in accordance with various aspects described herein. Method 250 can be performed by one or more devices alone or in combination including an SDN intelligence module or other computing device. In one embodiment, method 250 facilitates end to end orchestration and monitoring of a logical slice(s) of an access network from network to node(s) (e.g., cloud and/or Fog computing) using AI/ML enabled SDN.

At 252, service(s) can be sought or otherwise requested by one or more user devices. For example, user devices, such as mobile phones, can contact a tenant to obtain a particular communication service. In one embodiment, the service can be OTT video content provided by an OTT content provider. Other types of user devices, types of tenants, and/or services can also be utilized or implemented in and by method 250, including wired or wireless communication devices, gaming platforms, e-commerce platforms, social platforms, cloud-based applications, disaster-recovery platforms, and so forth. In one embodiment, the tenants can include virtual network operators that lack network RAN and core E2E infrastructure or that have limited capacity and/or coverage. For instance, the tenants can lease resources from other services/infrastructure providers, like Internet service or Telcom service providers.

At 254, one or more tenants can initiate a request(s) associated with the service(s). For example, the tenant(s) can initiate a service request(s) for Software As A Service (SaaS) from a slice service provider, such as via a GUI or other technique including via an Application Programming Interface (API).

At 256, the request(s) can be evaluated by equipment of the service provider. For example, a determination can be made based on the received request(s) and/or other information which may or may not be obtained from the tenant (e.g., additional information associated with the service to be provided to the user device, a service agreement between the tenant and the service provider, a service agreement between the user device and the tenant, and/or a service agreement between the user device and the service provider). In this example, the tenant(s) can be entities that are different from the entity operating or otherwise managing the network slicing. However, one or more embodiments described herein can include the tenant(s) and the service provider(s) being a same entity and utilizing one, some or all of the functionality described with respect to method 250, and/or other techniques and components described in one or more of the exemplary embodiments herein.

At 258, if the request is to be fulfilled in whole or in part by the service provider then the tenant and the service provider can communicate in order to obtain and/or provide various information (e.g., input) that is associated with network slicing, functionality to be implemented via the network slicing, and/or the service(s) to be provided by the tenant(s) to the user device(s). As an example, the functionality to be performed by the network slicing and/or the requirements to be satisfied by the network slicing can be communicated or otherwise negotiated between the tenant(s) and the service provider(s).

At 260, resource allocation can be determined including whether outsourcing is to be performed. For example after examining the needed or requested requirements, slices can be selected for allocation of resources of a software defined network. In one or more embodiments, edge computing can be implemented. For example, Fog nodes and/or MEC nodes can be utilized in the network slicing to satisfy workload requests for tenants. Various techniques and components can be utilized in the network slicing including virtualization, instantiating one or more virtual machines at the various nodes, and so forth. In other embodiments, the network slicing can be performed by way of other techniques which may or may not utilize edge computing, including through use of a cloud service architecture, decentralized architecture, or other infrastructure that can support network slicing.

If no outsourcing is to be performed then the method proceeds to 264. If on the other hand, it is determined that outsourcing is to be performed, then selected portions of loads can be outsourced at 262. For example, a determination can be made that one or more of the nodes (e.g., Fog nodes and/or MEC nodes) do not have available resources to satisfy one or more of the workload requests of the tenant(s). As described herein, the determination of resource availability and/or the allocation of resources via network slicing can be managed or otherwise implemented in various ways, including through use of artificial intelligence/machine learning modeling. The method 250 and its use of artificial intelligence/machine learning modeling can allow a service provider(s) to efficiently and effectively allocate network resources (e.g., in a network slicing environment), which can include providing network robustness and improved revenue generation methods, establishing a service differentiator over other service providers, providing AI-enabled SDN based slice management, facilitating the use of increased distributed edge automation, providing unique dynamic slice calculation and allocation, improving QoS and customer satisfaction, providing cost-efficient dynamic slice management, and/or adding a technique for monetization.

As an example, if a determination is made that outsourcing is to be performed then the server (e.g., an SDN intelligence module) can hunt for and find one or more other nodes that are capable of satisfying the workload request. In one embodiment, each node can partition its own resources according to the total received requests. This partitioning can be performed in coordination or consultation with the SDN intelligence module. If the node receives requests that exceed its available resources and/or capabilities (e.g., the received requests are outside of or do not satisfy a threshold; or in another embodiment trigger an outsourcing threshold due to the requested capacity being larger than the available capacity) then the node can coordinate or otherwise communicate with a regional orchestrater which in turn can coordinate with or otherwise communicate with the SDN intelligence module to outsource a portion of the load of the particular node to one or more other nodes, such as neighboring Fog or MEC nodes. In one embodiment, the selection of the load to be outsourced and/or the other node(s) to perform the outsourced portion of the load can be based on performance information that is provided to the SDN intelligence module by an analytics node(s) and/or based on notifications provided by the other node(s) indicating surplus resource capacity (e.g., notifications from the other node(s) that they are operating at or under a surplus capacity threshold at the present time and/or over a given period of time into the future).

In one or more embodiments, one or more devices (i.e., called herein an analytics node) can collect various data from the network (or from other sources) that allows for determining resource allocation and/or outsourcing portion(s) of a load(s) of a node(s) to other node(s), such as health statistics from the entire, or a portion of, the network including some or all of the virtual machines being implemented by the nodes (e.g., Fog and/or MEC nodes), some or all of the orchestrators, and/or some or all of other computing devices of the network. This data can then be utilized by the SDN intelligence module (e.g., via artificial intelligence/machine learning) to facilitate determining resource availability (e.g., in real-time) and to facilitate performing resource management (e.g., in real-time). In one embodiment, the SDN intelligence module (or another device(s)) can forecast or otherwise predict future bandwidth and/or slice availability based on past data and/or real-time data.

In one or more embodiments, the selection of the load to be outsourced and/or the other node(s) to perform the outsourced portion of the load can be based on artificial intelligence/machine learning modeling implemented by equipment of the service provider(s) (e.g., the SDN intelligence module) which can utilize various techniques and can be based on various data including the performance information collected by the analytics node from network devices, such as from the nodes, virtual machines operating at the nodes, or other network elements. As an example, the artificial intelligence/machine learning modeling can include supervised learning, unsupervised learning, semi-supervised learning, reinforcement learning, or a combination thereof. Other types of modeling and/or techniques can also be used including dimensionality reduction, feature learning, anomaly detection, artificial neural networks, decision trees, support-vector machines, regression analysis, and so forth.

At 264, slice orchestration and coordination can be performed to facilitate providing the service(s) via network slicing.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one embodiment, a prediction can be made (e.g., according to a machine learning model) of at least one of future resource availability for one or more nodes, future change to workload requirements for one or more workload requests of user device(s), future workload requests for one or more user devices, or a combination thereof. In this example, assigning of workload requests to nodes and/or outsourcing of a portion(s) of a load(s) can be performed based on the prediction, such as by the SDN intelligence module.

In one embodiment, performance statistics associated with the service provider network can be received by the SDN intelligence module from an analytics node(s). For instance, the analytics node(s) can collect the performance statistics from a group of devices including virtual machines (e.g., operating at the node(s) or elsewhere) and/or orchestrators. In one embodiment, the performance statistics can include fault management data (e.g., Commercial Power failure of the 5G node (gNB), MEC VM/slice failure, tower antenna failure, backhaul GW link failure, and so forth) and performance management data (e.g., Network KPI, including, Accessibility KPI, reachability KPI, Handoff failure counts, call detail record (CDR), and handset/device KPI, including call access attempt (success/failure), SNR (signal to noise ratio), connection loss, HO failure statistics, and so forth), which can include live or real-time data and/or historical data. In one embodiment, the performance statistics can include fault management data (e.g., Location/Site: TNCRX13xx FaultCount: 1 IinitialSeverity: 4 EquipmentType: NODEB FaultID: xxxDevice GeneralHwError), and performance management data (software internal system critical-info syslog] CPU[5/0]: Jun xx 23:59:59 afio: afio [5/0/9730] [2251752.526] afio/afio_api_cafc:319: #123515: unable to get scratch memory semaphore, fd=10, io=−1, errno=Resource temporarily unavailable), which can include live or real-time data and/or historical data.

In one embodiment, resource allocation (e.g., assigning of workload requests to nodes, outsourcing of a portion(s) of load(s) to other node(s)) can be based on a prediction(s) (e.g., made by the SDN intelligence module utilizing machine learning modeling applied to network performance statistics) as to whether a future target resource(s) will be functional or will not be functional at a particular future time (which can include over a time period that the user device is predicted to utilize the particular service). Other information can be utilized as part of determining or otherwise generating the prediction including the particular type of service that the network slicing is facilitating (e.g., OTT video content versus messaging), geographic location of the user device, time of day when service is being provided, length of content when service is delivering content, historical data associated with the user device as to length of time that the service has been utilized in the past, and so forth. In one or more embodiments, additional information which is not performance statistics of the network can be considered by the machine learning model in reaching a prediction or can be considered independently from the machine learning model.

One or more embodiments described herein enable management of network slicing for different tenants providing a same, similar and/or different services. The request for the network slicing can come from various devices (which may or may not be operated by the tenant) and can be provided to the SDN to decide resources to be invoked. As an example, the SDN intelligence module can operate as an intermediary between the virtual resources and the tenant devices. The network slicing can perform various functions and combinations of functions which facilitate providing the service(s) to the end user(s) including RAN-side functions, Core-side functions, and/or other functions. In one or more embodiments, the network slicing can be established or otherwise allocated with connectivity that facilitates the function(s) to be provided, such as connections to devices and components in various parts of the system, including RAN, Core, CPE, and so forth. Each of the tenants can obtain various numbers of network slices including a single slice or multiple slices which can be utilized for providing a same or different services to a single user device or multiple user devices.

In one or more embodiments, slicing requests (e.g., resource requests sent by tenant devices that are received or obtained by the SDN intelligence module) can specify required functions, components, parameters, QoS thresholds, and/or other criterion for one or more network slices to be instantiated. In one embodiment, the slicing request can specify one or more of the particular details required by the tenant device(s) and/or user device(s) for the service(s) as described herein. In another embodiment, the slicing request can specify the particular service and another device (e.g., the SDN intelligence module) can identify one or more of the particular details required by the tenant device(s) and/or user device(s) for the service(s). In one or more embodiments, the establishing of a network slice can be based on interaction or communication between the tenant device, the SDN intelligence module (or another network device), and/or the user device, such as a negotiation as to required or desired parameters or an inquiry into one or more of the particular details required by the tenant device(s) and/or user device(s) for the service(s). In one or more embodiments, the network slicing service can include bundling or packaging of slices with or without other network functionality provided by the network where a same or different bundle or packaging can be provided to each tenant device. In one or more embodiments, the SDN intelligence module is provided with a global view of the network (e.g., network performance information, resource availability, predicted resource availability, predicted service resource requirements) so that (e.g., based on use of the ML modeling) real-time intelligent allocation, re-allocation (e.g., outsourcing or adjusting an existing allocation) and management can be performed which can be an improvement for operation and performance in SDN networks.

Figure 3:
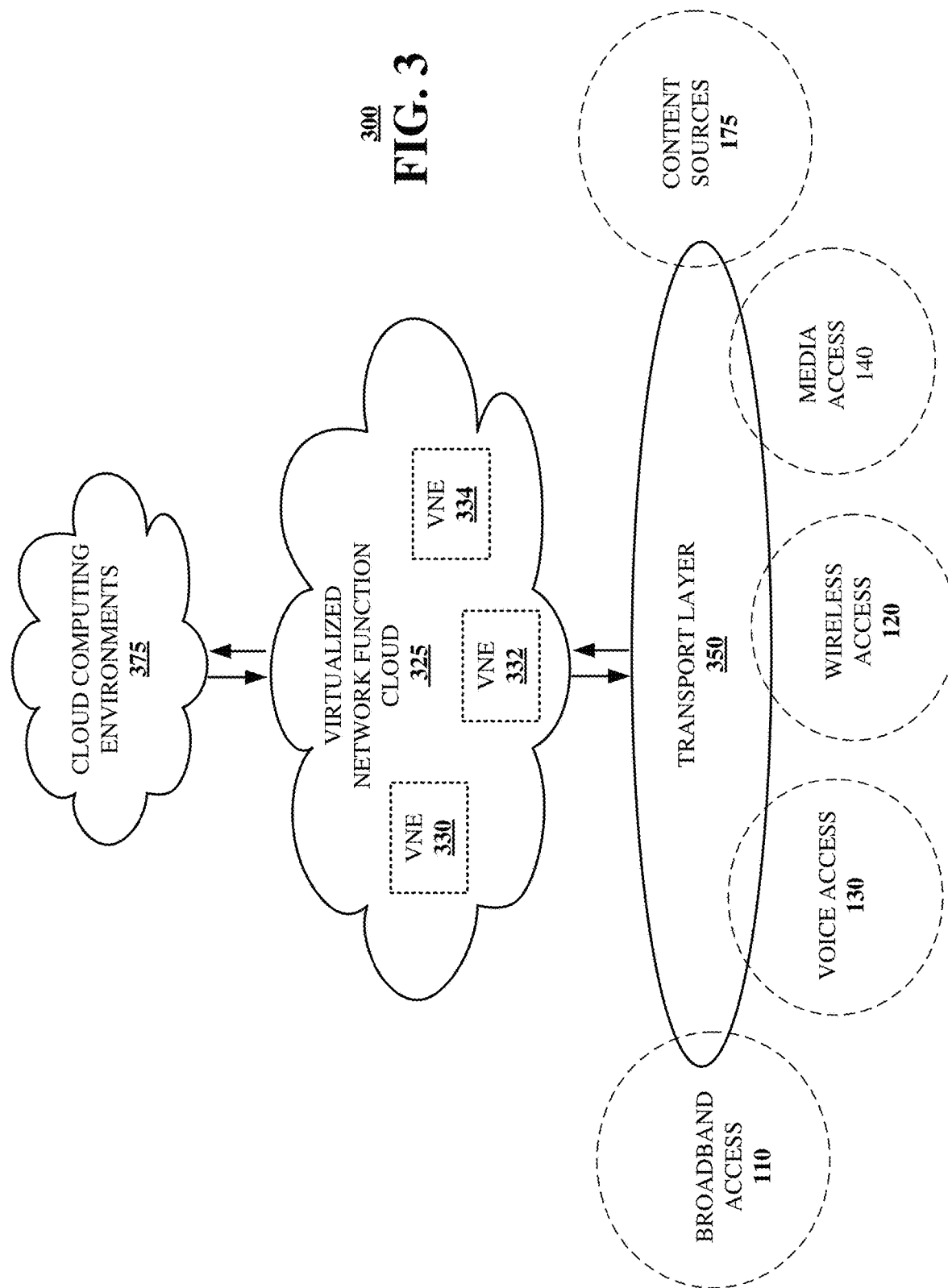
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 250 presented in FIGS. 1, 2A, 2B and 3. For example, virtualized communication network 300 can facilitate in whole or in part receiving, over a network from tenant devices, resource requests that include location information of user devices; assigning workload requests for each of the user devices to nodes (e.g., nodes that are determined to be closest to each of the user devices) where each of the nodes partition node resources according to total received requests and where the assigning the workload requests to the nodes is part of network slicing managed by the processing system in a software defined network; outsourcing a portion of a load of one or more of the nodes to other nodes according to a determination that the workload requests corresponding to the one or more overloaded nodes exceed a threshold associated with available resources of the one or more overloaded nodes; and/or determining (e.g., utilizing a machine learning model) a prediction of at least one of future resource availability for one or more of the nodes, future change to workload requirements for one or more of the workload requests of the user devices, future workload requests for one or more of the user devices, or any combination thereof, where assigning of the workload requests, the outsourcing of the portion of the load, or both can be based in part on the prediction.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 170 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
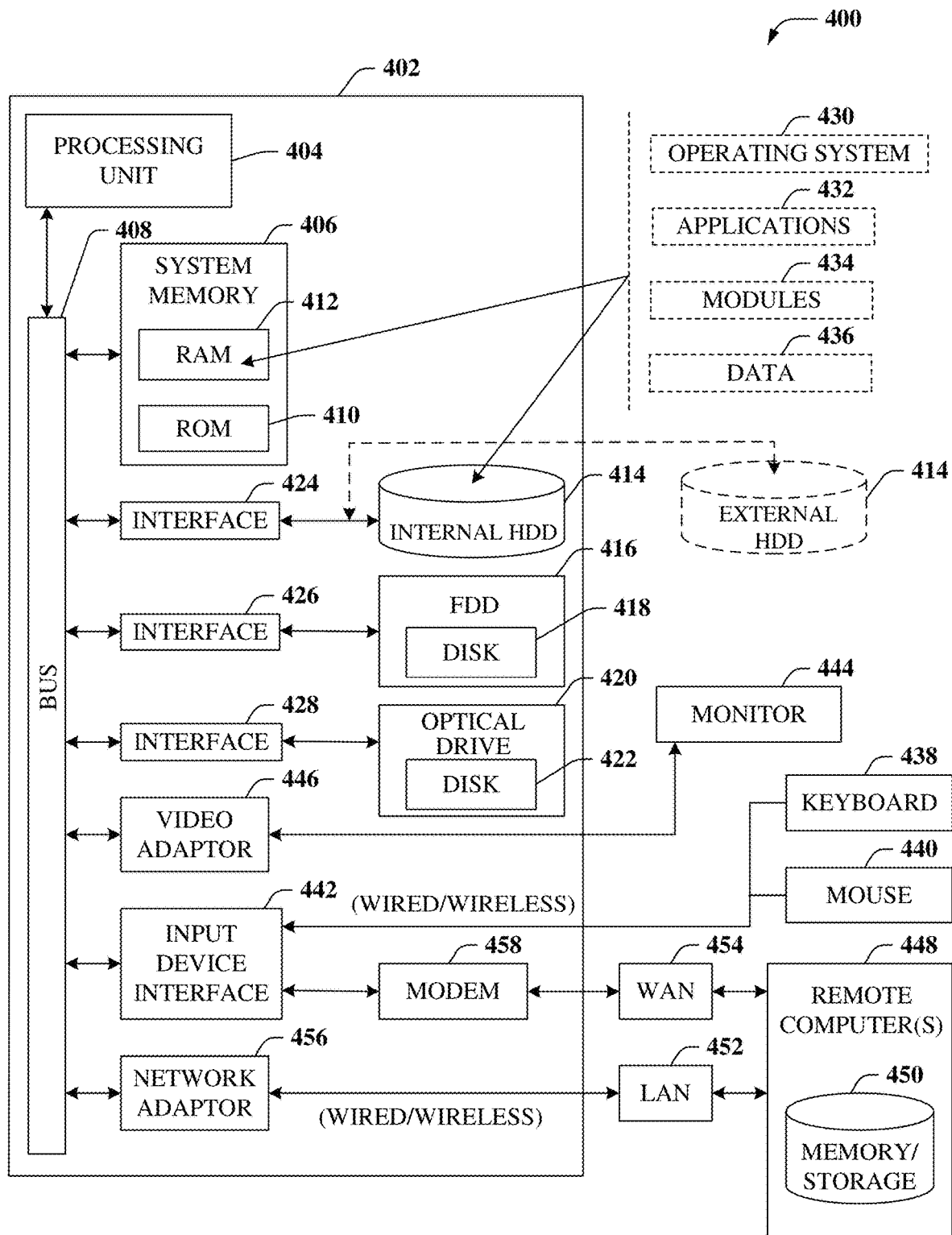
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part receiving, over a network from tenant devices, resource requests that include location information of user devices; assigning workload requests for each of the user devices to nodes (e.g., nodes that are determined to be closest to each of the user devices) where each of the nodes partition node resources according to total received requests and where the assigning the workload requests to the nodes is part of network slicing managed by the processing system in a software defined network; outsourcing a portion of a load of one or more of the nodes to other nodes according to a determination that the workload requests corresponding to the one or more overloaded nodes exceed a threshold associated with available resources of the one or more overloaded nodes; and/or determining (e.g., utilizing a machine learning model) a prediction of at least one of future resource availability for one or more of the nodes, future change to workload requirements for one or more of the workload requests of the user devices, future workload requests for one or more of the user devices, or any combination thereof, where assigning of the workload requests, the outsourcing of the portion of the load, or both can be based in part on the prediction.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
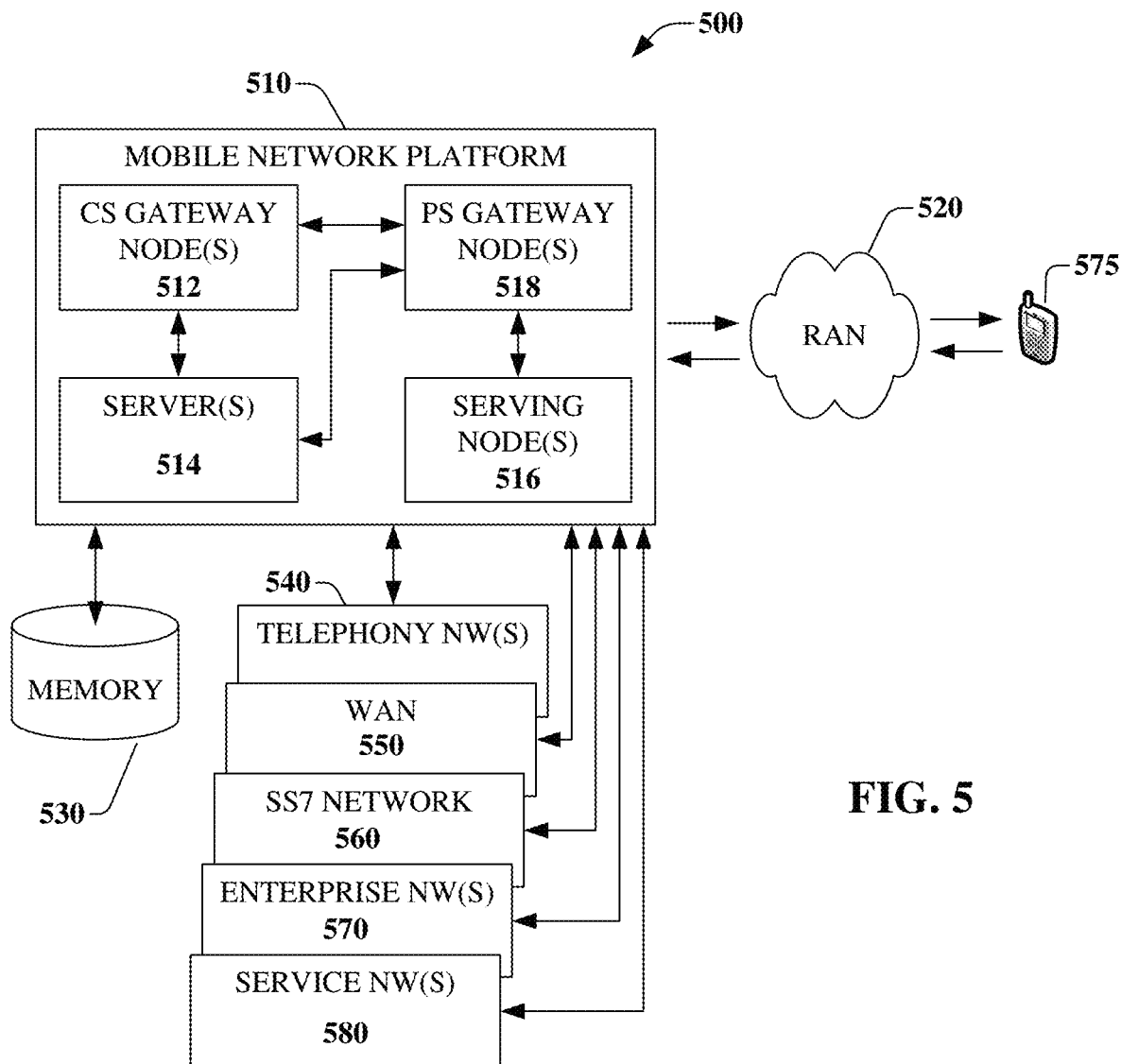
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part receiving, over a network from tenant devices, resource requests that include location information of user devices; assigning workload requests for each of the user devices to nodes (e.g., nodes that are determined to be closest to each of the user devices) where each of the nodes partition node resources according to total received requests and where the assigning the workload requests to the nodes is part of network slicing managed by the processing system in a software defined network; outsourcing a portion of a load of one or more of the nodes to other nodes according to a determination that the workload requests corresponding to the one or more overloaded nodes exceed a threshold associated with available resources of the one or more overloaded nodes; and/or determining (e.g., utilizing a machine learning model) a prediction of at least one of future resource availability for one or more of the nodes, future change to workload requirements for one or more of the workload requests of the user devices, future workload requests for one or more of the user devices, or any combination thereof, where assigning of the workload requests, the outsourcing of the portion of the load, or both can be based in part on the prediction. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
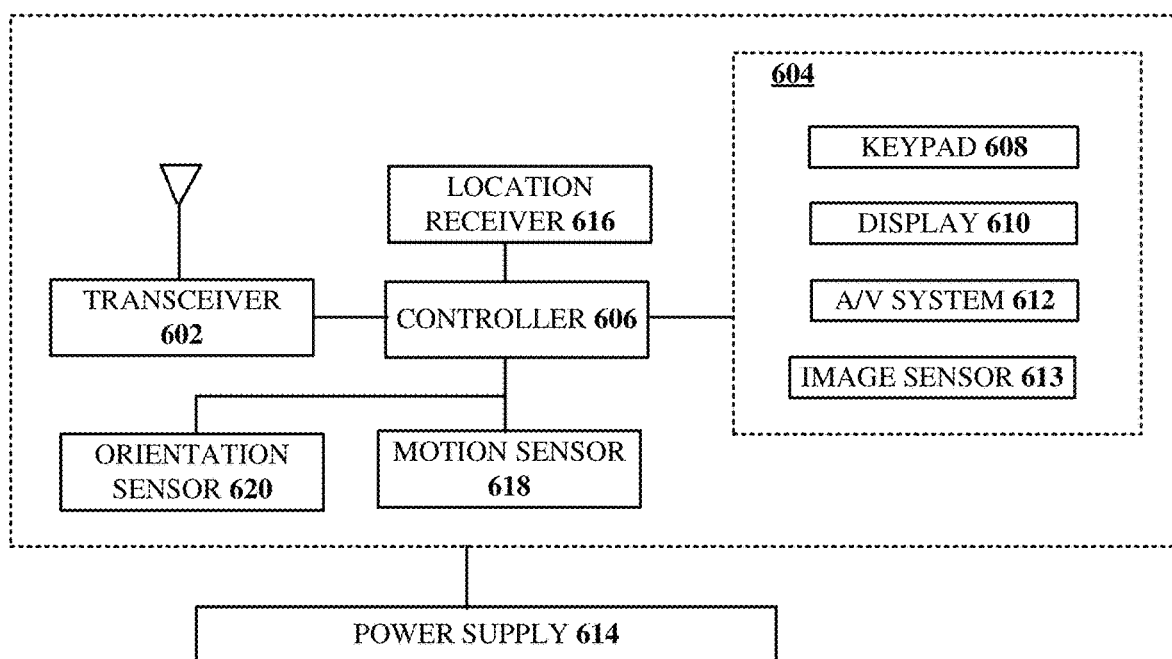
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part receiving, over a network from tenant devices, resource requests that include location information of user devices; assigning workload requests for each of the user devices to nodes (e.g., nodes that are determined to be closest to each of the user devices) where each of the nodes partition node resources according to total received requests and where the assigning the workload requests to the nodes is part of network slicing managed by the processing system in a software defined network; outsourcing a portion of a load of one or more of the nodes to other nodes according to a determination that the workload requests corresponding to the one or more overloaded nodes exceed a threshold associated with available resources of the one or more overloaded nodes; and/or determining (e.g., utilizing a machine learning model) a prediction of at least one of future resource availability for one or more of the nodes, future change to workload requirements for one or more of the workload requests of the user devices, future workload requests for one or more of the user devices, or any combination thereof, where assigning of the workload requests, the outsourcing of the portion of the load, or both can be based in part on the prediction.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving, at a software defined network (SDN) controller, over a network from a plurality of tenant devices, a plurality of requests for network slices, wherein a first request for a network slice of the plurality of requests for network slices includes resource requests that include location information of user devices served by a first tenant device of the plurality of tenant devices, and wherein the first tenant device provided the first request for a network slice;
creating, by the SDN controller in response to the receiving the first request for a network slice, a first network slice, wherein the creating the first network slice comprises assigning workload requests for each of the user devices to nodes that are determined to be closest to each of the user devices, wherein each of the nodes partition node resources according to total received requests;
outsourcing a portion of a load of a first node of the nodes to a second node of the nodes according to a determination that the workload requests corresponding to the first node exceed a threshold associated with available resources of the first node;
receiving a notification from a third node of the nodes that the third node has surplus resources, wherein the notification is received via a regional orchestrator;
coordinating with a fourth node to forward another portion of another load of the fourth node to the third node; and
receiving performance statistics associated with the network from an analytics node, wherein the analytics node collects the performance statistics from a group of devices including virtual machines and orchestrators, and
wherein the performance statistics include fault management data and performance management data.

2. The device of claim 1, wherein the operations further comprise determining, utilizing a machine learning model, a prediction of a combination of at least one of future resource availability for one or more of the nodes, future change to workload requirements for one or more of the workload requests of the user devices, future workload requests for one or more of the user devices, wherein the assigning of the workload requests, the outsourcing of the portion of the load, or both are based in part on the prediction.

3. The device of claim 1, wherein the device is operated by a first entity, wherein the plurality of tenant devices are operated by one or more second entities distinct from the first entity, and wherein the first network slice facilitates an Over-The-Top video service provided by the first tenant device to one of the user devices.

4. The device of claim 1, wherein the operations further comprise determining, utilizing a machine learning model, a prediction of future resource availability for one or more of the nodes, wherein the assigning of the workload requests, the outsourcing of the portion of the load, or both are based in part on the prediction.

5. The device of claim 1, wherein the operations further comprise determining, utilizing a machine learning model, a prediction of future change to workload requirements for one or more of the workload requests of the user devices, wherein the assigning of the workload requests, the outsourcing of the portion of the load, or both are based in part on the prediction.

6. The device of claim 1, wherein the operations further comprise determining, utilizing a machine learning model, a prediction of future workload requests for one or more of the user devices, wherein the assigning of the workload requests, the outsourcing of the portion of the load, or both are based in part on the prediction.

7. The device of claim 1, wherein the nodes include fog nodes arranged in a hierarchical mesh.

8. The device of claim 1, wherein the nodes include MEC nodes arranged in a flat architecture.

9. The device of claim 1, wherein the nodes include fog nodes, MEC nodes or a combination thereof.

10. The device of claim 1, wherein the outsourcing of the portion of the load of the first node is based on coordination with a regional orchestrator.

11. The device of claim 1, wherein at least one of the assigning of the workload requests, the outsourcing of the portion of the load, or both is based in part on a prediction as to whether a future target resource will be functional or will not be functional at a particular future time.

12. A method, comprising:
receiving, by a software defined network (SDN) controller that includes a processing system including a processor over a network from a plurality of tenant devices, a plurality of requests for network slices, wherein a first request for a network slice of the plurality of requests for network slices includes resource requests that include location information of user devices served by a first tenant device of the plurality of tenant devices, and wherein the first tenant device provided the first request for a network slice;
creating, by the processing system, in response to the receiving the first request for a network slice, a first network slice, wherein the creating the first network slice comprises assigning, by the processing system, workload requests for each of the user devices to nodes that are determined to be closest to each of the user devices, wherein each of the nodes partition node resources according to total received requests;
outsourcing, by the processing system, a portion of a load of a first node of the nodes to a second node of the nodes according to a determination that the workload requests corresponding to the first node exceed a threshold associated with available resources of the first node;
receiving, by the processing system, a notification from a third node of the nodes that the third node has surplus resources, wherein the notification is received via a regional orchestrator;
coordinating, by the processing system, with a fourth node to forward another portion of another load of the fourth node to the third node; and
receiving, by the processing system, performance statistics associated with the network from an analytics node, wherein the analytics node collects the performance statistics from a group of devices including virtual machines and orchestrators, and wherein the performance statistics include fault management data and performance management data.

13. The method of claim 12, further comprising:
determining, utilizing a machine learning model, a prediction of at least one of future resource availability for one or more of the nodes, future change to workload requirements for one or more of the workload requests of the user devices, future workload requests for one or more of the user devices, or any combination thereof, wherein the assigning of the workload requests, the outsourcing of the portion of the load, or both are based in part on the prediction.

14. The method of claim 12, wherein the processing system is operated by a first entity, wherein the plurality of tenant devices are operated by one or more second entities distinct from the first entity, and wherein the first network slice facilitates an Over-The-Top video service provided by the first tenant device to one of the user devices.

15. The method of claim 12, wherein the outsourcing of the portion of the load of the first node is based on coordination with a regional orchestrator.

16. The method of claim 12, wherein the nodes include MEC nodes.

17. The method of claim 12, wherein the nodes include fog nodes.

18. The method of claim 17, wherein the fog nodes form a hierarchical mesh.

19. The method of claim 18, wherein the nodes include a combination of fog nodes and mesh nodes.

20. A non-transitory machine-readable medium, comprising executable instructions that, when executed by a processing system including a processor, facilitate performance of operations, the operations comprising:
receiving, at a software defined network (SDN) controller, over a network from a plurality of tenant devices, a plurality of requests for network slices, wherein a first request for a network slice of the plurality of requests for network slices includes resource requests that include location information of user devices served by a first tenant device of the plurality of tenant devices, and wherein the first tenant device provided the first request for a network slice;
creating, by the SDN controller in response to the receiving the first request for a network slice, a first network slice, wherein the creating the first network slice comprises assigning workload requests for each of the user devices to nodes that are determined to be closest to each of the user devices, wherein each of the nodes partition node resources according to total received requests;
outsourcing a portion of a load of a first node of the nodes to a second node of the nodes according to a determination that the workload requests corresponding to the first node exceed a threshold associated with available resources of the first node;

receiving a notification from a third node of the nodes that the third node has surplus resources, wherein the notification is received via a regional orchestrator;

coordinating with a fourth node to forward another portion of another load of the fourth node to the third node; and receiving performance statistics associated with the network from an analytics node, wherein the analytics node collects the performance statistics from a group of devices including virtual machines and orchestrators, and wherein the performance statistics include fault management data and performance management data.

* * * * *